(12) United States Patent
Borkman et al.

(10) Patent No.: US 6,889,144 B2
(45) Date of Patent: May 3, 2005

(54) LIFE PREDICTION FOR GAS PURIFIERS

(75) Inventors: James Donald Borkman, Clarence, NY (US); Mark L. Malczewski, North Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 18 days.

(21) Appl. No.: 10/462,573

(22) Filed: Jun. 16, 2003

(65) Prior Publication Data

US 2004/0254739 A1 Dec. 16, 2004

(51) Int. Cl.[7] ............................................. G06F 19/00
(52) U.S. Cl. ............................. 702/23; 702/24; 702/25; 702/50
(58) Field of Search ............................. 702/23, 24, 25, 702/29, 47, 50, 189, 190, 31, 32, 55; 73/1.06, 31.03; 210/436, 472, 646

(56) References Cited

U.S. PATENT DOCUMENTS

| | | | | |
|---|---|---|---|---|
| 5,138,869 A | * | 8/1992 | Tom | 73/31.03 |
| 5,150,604 A | * | 9/1992 | Succi et al. | 73/38 |
| 5,172,066 A | * | 12/1992 | Succi et al. | 324/693 |
| 5,294,407 A | * | 3/1994 | Succi et al. | 422/119 |
| 5,304,797 A | * | 4/1994 | Irie et al. | 250/287 |
| 5,334,237 A | * | 8/1994 | Lorimer | 95/25 |

* cited by examiner

Primary Examiner—Bryan Bui
(74) Attorney, Agent, or Firm—Iurie A. Schwartz

(57) ABSTRACT

The invention is a method and a device for measuring the filtering or purifying capacity of a purifier. The invention allows the use of a single analyzer for sampling the inlet and outlet streams. This is accomplished by sampling the inlet stream only at some times when the change in the inlet stream is expected to occur. At other times the outlet stream is sampled to monitor its composition. A computer system on the basis of the accumulated data decides when it is time to replace or to regenerate the purifier or the filter bed. The computer system also determines the strategy of when to sample the inlet stream. Various system sensors may be used to make this determination, such as pressure sensors and level sensors. The data from other sensors, such as flow sensors, may be used in the calculations performed by the computer system.

20 Claims, 3 Drawing Sheets

LIFE PREDICTION FOR GAS PURIFIERS

BACKGROUND OF THE INVENTION

This invention generally relates to monitoring the amount of one or several substances accumulated in a container where the monitoring is done by observing the streams entering and leaving the container and the observation means are limited. More specifically, the invention deals with the task of determining the expected lifetime of a filter standing between two streams of gas.

When ultra high purity (UHP) product gases are supplied to semiconductor manufacturers, each of the supplied bulk process gases is typically purified before use by the manufacturer. In addition, these purified process gases are monitored continuously for certain key impurities. Some purifiers can be regenerated and have dual beds, one, on-line, purifying the product and the other regenerating or in a standby mode.

Three types of purifiers are most commonly used to provide purified process gases for use in semiconductor device manufacturing. First, there are the re-generable purifiers. These typically contain nickel metal immobilized on an inert solid support. The nickel metal can chemically remove oxygen and carbon monoxide. In addition, either the nickel metal or the solid support can physically absorb moisture, hydrogen, and carbon dioxide. One bed purifies the process gas at ambient temperature. The second bed regenerates at a high temperature, with the introduction of a reducing gas to regenerate the nickel metal from the oxide.

The second type of purifier is a consumable resin based getter, such as that made by Nanochem. This type of purifier is specific for the removal of oxygen, moisture, and carbon dioxide. A useful end of life test exists for this type of purifier as the resin changes color as the active material is expended, and a simple colorimetric sensor can monitor purifier lifetime.

The third type of consumable purifier is the heated transition metal getter. The unit operates at elevated temperature (350–400° C.) and chemically destroys or physically sorbs a number of impurities including nitrogen in inert gas streams. The purifier has varying capacity depending upon the specific impurity being considered.

Recently, the trend has been to use transition metal getter based purifiers, which are available to handle typical flow rates of gases such as helium, argon, nitrogen and hydrogen. These purifiers have the advantages of simplicity of operation, and the ability to remove a somewhat wider spectrum of impurities in a variety of process gasses. However, the one drawback to this type of purifier is that the getter material is consumable and cannot be regenerated. When spent, the purifier bed must be replaced at a typical cost of $50,000 per bed.

Knowing when to replace the purifier beds is a critical concern. Waiting too long runs the risk of allowing impurities to break through into the process gas stream resulting in lost product and process downtime. Replacing the beds at too short an interval incurs additional cost in replacing beds prematurely.

The continuous monitoring systems will alarm in the event of an impurity breakthrough, but this only detects a problem after it occurs. The optimal solution is to predict impending purifier breakthrough in time to take the appropriate corrective action.

For consumable purifiers, this involves determining the optimal time for bed replacement. For re-generable purifiers, this would allow optimization of the time between bed regenerations, which minimizes the power consumption.

Several methods to determine purifier end-of-life are generally known. One is to use the bed life estimates based on flow rate and inlet impurity levels provided by purifier manufacturers.

Most purifier manufacturers characterize their getter materials in terms of both spectrum of impurities removed and capacity of the material to remove each impurity per unit weight of getter material. Based on these parameters, many purifier manufacturers guarantee a purifier lifetime of one or two years for a given customer flow rate and impurity inlet challenge. For re-generable getter materials these tests determine the time between bed regenerations.

Although flow rate through the purifier is typically a measured quantity, and its effect on purifier lifetime is linear, impurity inlet challenge is typically not measured. Lower than expected impurity levels can lead to premature replacement of purifier beds or unnecessary bed regenerations. Higher inlet challenges can shorten purifier life and cause degradation of the purified process gas before the purifier is considered "spent." In other words, this method may overestimate or underestimate bed life depending on the changing inlet impurity challenge and customer product demand.

Another solution to the problem is to monitor the purifier effluent for a number of impurities and sound an alarm when one or more of the impurities break through into the purified process gas. This approach is attractive as most facilities have continuous monitoring in place for most process gases. The problem with this approach is that it is not proactive. An alarm is sounded only after an impurity breakthrough has occurred. One could consider setting the impurity alarms at a lower concentration than the manufacturing process can tolerate in order that a corrective action can be taken before these impurity concentrations increase to an intolerable level. However, the usefulness of this approach is limited, as any increase of impurities above the detection limits of the various analyzers is considered detrimental and unacceptable to the chip manufacturing process.

Yet another solution is to use a purifier end of life sensor alerting the user when the bed breakthrough is imminent. For example, transition metal based getter materials swell as they consume impurities. This causes changes in both the volume and the electrical characteristics of the getter materials. Several patents have been issued on various methods that take advantage of this effect.

As the material swells, the porosity of the purifier bed decreases, and the resistance to flow increases. Therefore, to maintain the flow rate, the differential pressure across the purifier also increases. The differential pressure rise can be measured with one or more pressure sensors and correlated to purifier lifetime, and breakthrough time as described in U.S. Pat. No. 5,150,604.

As the getter material swells, the resulting pressure expands the containment vessel slightly. This expansion can be measured with a strain gauge in lieu of the pressure sensors described above. Correlation of strain with purifier lifetime is similar to that described for the pressure sensors. This method is described in U.S. Pat. No. 5,151,251.

As an oxide layer forms on the getter material, the electrical resistance changes with time, which can also be correlated with purifier lifetime. Using this type of measurement is described in U.S. Pat. No. 5,172,066.

A pressure sensitive switch can be embedded in the getter material, and swelling of the material can compress the switch and trip an alarm to indicate the end of purifier life has been reached. This approach is described in U.S. Pat. No. 5,294,407.

All the sensor technologies depending upon volume or resistance change suffer from a common disadvantage. Not all impurities affect the bed material the same way, and, more importantly, the purifier material has differing capacities for different impurities. The swelling and resistive changes are primarily caused by the absorption of oxygen from the process gas being purified. In addition most of the getter materials have a high capacity for oxygen and moisture. Other impurities, notably, nitrogen and carbonaceous impurities, such as methane and carbon monoxide, not only cause limited swelling of the getter material, but also have much lower affinities for the getter material.

For example, an argon purifier with a consumable bed has extremely high capacity for O2 and H2O, but limited capacity for N2 and CH4. The end of life sensor will trigger the alarm if the purifier is reaching capacity for O2, but not necessarily if it has reached its capacity for N2. Thus, the end of life sensor can indicate that the purifier is performing properly and still be allowing N2 into the purified process gas. This is of particular concern as N2 is usually the highest concentration impurity in the argon supplied to the purifier.

The end result is that the end of life sensor could indicate that the purifier is still performing properly, but the purifier may have broken through for one or more specific impurities such as nitrogen and/or methane. Also these approaches work only for certain classes of getter materials, in the patents described above the transition metal based getter materials. If different materials and purification chemistries are used they may not be amenable to the end of life sensor approach.

A different approach is disclosed in U.S. Pat. No. 5,334,237. It describes the use of a sacrificial model purifier to determine when the main or system purifier is spent. The model purifier made of the same material as the larger system purifier is fed a measured proportional flow of the process gas. If the model purifier is consumed in 6 months, for example, and has 20% the capacity of the system purifier, the system should then last three years. This approach introduces several complications. First, it requires analysis with one or more expensive analyzers and someone skilled to operate them. This loses a major advantage of the end of life sensor approach. Second, it calls for a model purifier of 25%–50% of the capacity of the system purifier and additional process gas flow control and monitoring. For large process gas flows, this could represent a complex system with increased capital equipment costs. Third, after the model purifier has been expended, extrapolation of the lifetime of the system purifier assumes that the inlet impurity challenge remains constant over the lifetime. This may or may not be a true assumption.

SUMMARY OF THE INVENTION

The present invention addresses the problems and needs of the prior art. In particular, the present invention provides a method and a device for determining the amount of a substance in a container, such as a filter or a purifier. This is accomplished by diverting a sample stream from the filter's inlet and another sample stream from the container's outlet to the automated sample manifold. An analyzer at certain times analyzes the inlet stream and analyzes the outlet stream at other times. In addition or instead of analyzing the inlet stream the analyzer may analyze the stream entering a supply reservoir from which the inlet stream originates. By correctly scheduling the times when each stream is analyzed, an accurate determination of the container's available capacity is made by a computation unit. The selection of which stream is sampled by the analyzer at a given moment is also controlled by the computation unit. This selection may be made on the basis of data supplied by a level sensor or a pressure sensor coupled to the supply fed to the container's inlet. The pressure sensor, in particular, determines when the supply reservoir is being refilled. A flow sensor provides the computation unit with data describing the flow rate through the container. This data also may be used for computing the container's remaining capacity.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
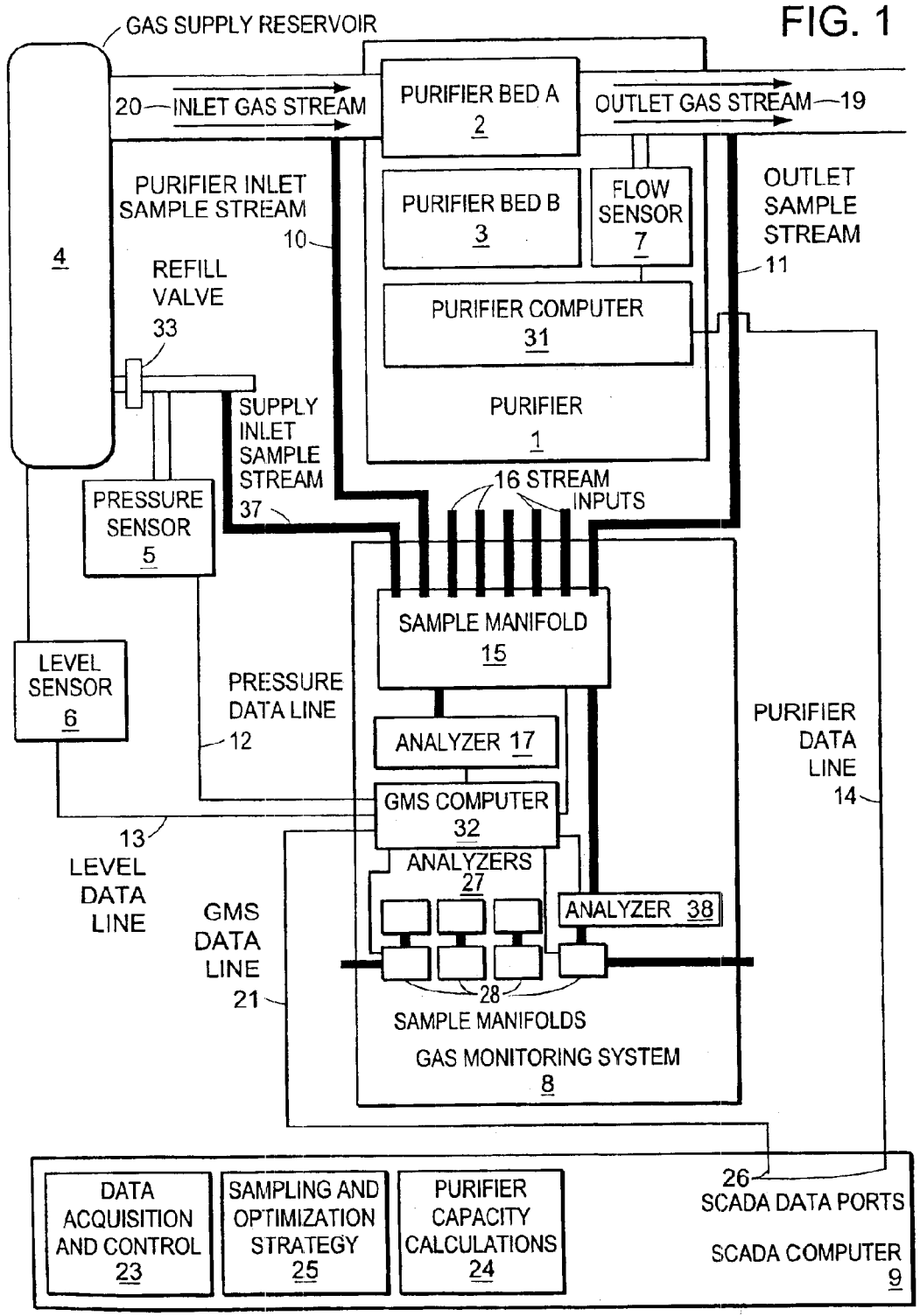
FIG. 1 is a schematic diagram of one implementation of the present invention.

FIG. 1 shows a preferred embodiment of the invention used to determine the expected available lifetime of a purifier bed, or any filter or container, standing between two streams of gas. The prediction of purifier bed life is accomplished by dynamically tracking percentage of purifier bed consumption continuously in real time. The purifier bed is consumed as the substance removed from the inlet gas stream accumulates in the bed, the bed serving as the container for the substance.

This embodiment of the invention includes a purifier 1 having two purifier beds 2 and 3, of which one, the purifier bed A 2, is online, while another, the purifier bed B 3, is being regenerated for subsequent use. The outlet gas stream 19 is purified as the purifier bed A accumulates the impurities it extracts from the inlet gas stream 20 arriving from a gas supply reservoir 4.

The gas supply reservoir 4 is refillable via the refill valve 33. In one embodiment of the invention, the gas in the gas supply reservoir 4 is stored as cryogenic liquid. The level sensor 6 measures the amount of gas in the gas supply reservoir 4. The pressure sensor 5 measures the outside gas pressure on the input of the gas supply reservoir's refill valve 33.

In the embodiment of the invention shown on FIG. 1, the purifier 1 includes a flow sensor 7 measuring the flow rate of gas through the purifier 1 and communicating this information to the purifier computer 31. The flow sensor 7 may be positioned at the purifier inlet as well as at the purifier outlet; it may also be positioned outside the purifier 1.

In the embodiment of the invention shown on FIG. 1, the purifier computer 31 controls which purifier bed is online and which is being regenerated, A or B, 2 and 3, respectively.

The inlet and outlet sample streams 10 and 11 from, respectively, the inlet and outlet gas streams 20 and 19 are directed to the gas monitoring system (GMS) 8. The supply reservoir inlet sample stream 37 is also directed to the GMS 8.

Incorporated into the GMS 8 is a sample stream selection manifold 15 for each sample gas with multiple stream inputs 16. The manifold receives the sample streams 37, 10, and 11 through the inputs 16. The manifold 15's output streams are directed to the analyzers 17 and 38. The analyzers 17 and 38 test the selected sample streams for different impurities, for example, the analyzer 17 may measure the amount of water in the sample while the analyzer 38 may measure the amount of oxygen in the sample. Other inputs 16 may be connected to different points in the system where the analyzer 17 or analyzer 38 may be used. This approach allows the expensive analyzers 17 and 38 to be used more cost effectively by being able to sample more than one sample point within the system with a single analyzer. For each sample manifold 15, only one sample stream can be active at a given time, and the sample manifold 15 has provisions for continuous purging of each sample stream, as well as purging of the portion of the sample manifold 15 downstream of the selector valves within the sample manifold 15 to allow rapid switching from one sample stream to another. The stream selector valves within the manifold 15 are controlled by the GMS computer 32, which prevents multiple sample valves within the sample manifold 15 from being opened simultaneously, and allows for the implementation of a sample selection strategy by the system.

The GMS 8 also may incorporate additional analyzers 27, sample manifolds 28, and computers. Samples from other streams may be directed to the analyzers 27 through the sample manifolds 28 to monitor and calculate capacity of other purifier beds. Also, the inlet and outlet gas streams 20 and 19 can be sampled with different analyzers 27 for different impurities using the sample manifolds 28.

One type of GMS available on the market is a Praxair, Inc. supplied fully automated analytical system, which provides continuous part-per-billion (ppb) analyses for several impurities in one or more sample gases.

In the embodiment of the invention shown on FIG. 1, the GMS computer 32 receives information from the pressure sensor 5, the level sensor 6, and the analyzers 17 and 38. In particular, the pressure data line 12 carries information from the pressure sensor 5 to the GMS computer 32 and the level data line 13 carries information from the level sensor 6 to the GMS computer 32.

Another part of the embodiment of the invention shown on FIG. 1 is the SCADA (Supervisory Control and Data Acquisition) computer 9 used for data acquisition, control and archiving. Large amounts of data from analytical panels, purifiers, plants etc. are uploaded typically on a running basis to the SCADA computer 9 and are managed by the data acquisition and control software 23. SCADA computer 9 runs one of the commercially available data acquisition and process control software packages currently on the market, such as a package available from Intellution, Inc.

SCADA computers 9 in combination with GMS's 8 are used in prior art systems for continuous automatic monitoring of impurities in the outlet gas stream 19. In such prior art systems, the SCADA computers 9 store the data received from sensors and GMS 8 for archiving purposes and alert the system user when the level of impurities in the outlet gas stream 19 exceeds the acceptable level. The prior art SCADA computers 9 do not determine the purifying capacity of the purifier bed 2.

In the embodiment of the invention shown on FIG. 1, the SCADA computer 9 receives data from the GMS computer 32 over the GMS data line 21 and receives data from the purifier computer 31 over the purifier data line 14. These data include the information received from level sensor 6, pressure sensor 5, flow sensor 7, analyzers 17, 38, and 27, and sample manifolds 15 and 28. In other embodiments of this invention, these data may be sent to SCADA computer 9 directly, i.e., bypassing the intermediate computers 32 and 31 and connecting the appropriate data lines (such as pressure data line 12 or level data line 13) directly to the SCADA data ports 26. The SCADA computer 9 is usually capable of storing, archiving, and displaying at least some of the received data using software 23. In this invention, the SCADA computer 9 also calculates the capacity of purifier 1 for impurities and controls the GMS manifolds 15 and 28 using the software modules 25 and 24. This control may be performed through the GMS computer 32, as shown on FIG. 1, or directly by connecting a control line to one of the SCADA data ports 26.

In the embodiment of the invention shown on FIG. 1, the purifier bed capacity formulas for each purifier model and for the necessary impurities are provided by the purifier bed manufacturer and input to the SCADA computer 9 to be used by the purifier capacity calculations software 24. The SCADA computer 9 is provided with data for the various impurities in the inlet gas stream 20 and with data regarding continuous gas flow rate through the purifier 1. The inlet data comes from sampling the impurities in the inlet gas stream 20 at the purifier 1's inlet using the analyzers 17 and 38 in the GMS 8 either continuously or on demand. Instead of or in addition to sampling the inlet gas stream 20, the SCADA computer 9 may use the data coming from sampling through the supply reservoir inlet sample stream 37 the impurities in the supply reservoir inlet stream during supply reservoir refills. From these data, the SCADA computer 9 on a running basis accurately computes the incremental consumption of the purifier bed A 2 for each impurity. For these computations, SCADA computer 9 uses the purifier capacity calculations software 24. The purifier capacity calculations software 24 adds up the values for incremental consumption of a purifier bed thus providing the percentage consumption of the bed, for each impurity. This allows accurate predictive maintenance, in which the bed A 2 is replaced by the regenerated bed B 3 before impurity breakthrough but not until the bed A 2 has been almost fully spent. This is accomplished upon a command sent from the SCADA computer 9 through the purifier data line 14 to the purifier computer 31. Alternatively, a separate data line may be used. Once the bed B 3 is online, the regeneration of bed A 2 begins.

Without this approach, each purifier bed has to be alternately regenerated on a time basis usually once every 48 hours, without any consideration of the remaining bed capacity. This is wasteful in terms of power consumption as the bed regeneration usually occurs at an elevated temperature of 200–400° C. Also, a regeneration gas, typically hydrogen, is required in combination with 5–10% of the purified gas from the online bed. Also, the wear on equipment increases as the heaters cycle valves open and close unnecessarily. The present invention lengthens the time between the regenerations and decreases their frequency.

An important feature of the embodiment of the invention shown on FIG. 1 is the automated control of the sampling strategy for the inlet gas stream 20 by the sampling and optimization strategy software 25 running on the SCADA computer 9. The invention allows the user to monitor the purity of the outlet gas stream 19 without having to use an additional costly and complex analyzer system to monitor the purity of the inlet gas stream 20. The use of a separate analyzer system can be avoided by properly choosing using the sampling and optimization strategy software 25 when to sample the inlet gas stream 20, as described below. The sampling and optimization strategy software 25 has all the information necessary to make a choice of the times to sample the inlet gas stream 20. In particular, the gas supply reservoir 4's level and pressure are important factors in making this determination.

The concentration of impurities in the inlet gas stream 20 changes most abruptly when the gas supply reservoir 4 is refilled. One possible reason is the different impurity level in the new load of gas. On some occasions, an error during filling of the gas supply reservoir 4 may introduce additional air contaminants into the gas. The sampling and optimization strategy software 25 determines that a fill of the gas supply reservoir 4 is in progress when the reservoir liquid level begins to rise, which is determined by the level sensor 6. Alternatively, the pressure sensor 5 may inform the SCADA computer 9 that a fill is about to begin. This is the preferred method of determining when a fill is about to begin. Upon receiving this information over pressure data line 12 and/or level data line 13, the SCADA computer 9 using the sampling and optimization strategy software 25 instructs the GMS 8 to begin sampling the inlet gas stream 20.

The SCADA computer 9 sends the appropriate signal to the GMS computer 32 over the data line 21 linking the two computers; alternatively, a separate line may be provided for this purpose. Upon receipt of the command, the GMS computer 32 suspends testing of the current sample stream and begins sampling of the purifier inlet gas stream 20 by sending inlet sample stream 10 to the analyzer 17 through the sample manifold 15. The SCADA computer 9 may confirm that the command has been carried out because the valve positions in the sample manifold 15 are part of the data acquired by SCADA computer 9 from the GMS computer 32 via the GMS data line 21. The SCADA computer 9 may alert the operator in the unlikely event of an error during the fill procedure.

The sampling of the inlet gas stream 20 continues until a stable reading for all the monitored impurities are obtained. These new inlet impurity concentrations are accounted for in the purifier life calculations software 24 in order to maintain the accuracy. When the purifier inlet gas stream 20 sampling and analysis is complete and the analyzer 17 readings are stable, the sampling and optimization strategy software 25 and the SCADA computer 9 instruct the GMS computer 32 to resume the normal sampling and analysis process: the sample manifold 15 is switched so that the analyzer 17 continuously samples the outlet gas steam 19 and sends the results to the SCADA computer 9 through the GMS computer 32 and the GMS data line 21.

The concentrations of impurities in the inlet gas stream 20 remain relatively stable during the time between fills of the gas supply reservoir 4. This assumption may be checked by monitoring of the purifier inlet gas stream 20 at timed intervals or at fixed liquid levels over the lifetime of a supply gas reservoir fill. If the concentrations of impurities in the inlet gas stream 20 remain stable, the length of time between these "spot checks" can be lengthened. During the time when other purified gas streams are being monitored, which is normally most of the time, the SCADA computer 9 holds the most recent analysis values for each impurity and uses it in the purifier bed life calculations to maintain the highest available accuracy.

An alternative sampling and calculation strategy may involve sampling through the supply reservoir inlet sample stream 37 the impurities in the supply reservoir inlet stream during supply reservoir refills and then taking this value into account in the subsequent purifier bed life calculations, for example by assuming that the amount of impurities in the inlet gas stream 20 is equal to the level of impurities in the gas sampled through the supply reservoir inlet sample stream 37.

Figure 2:
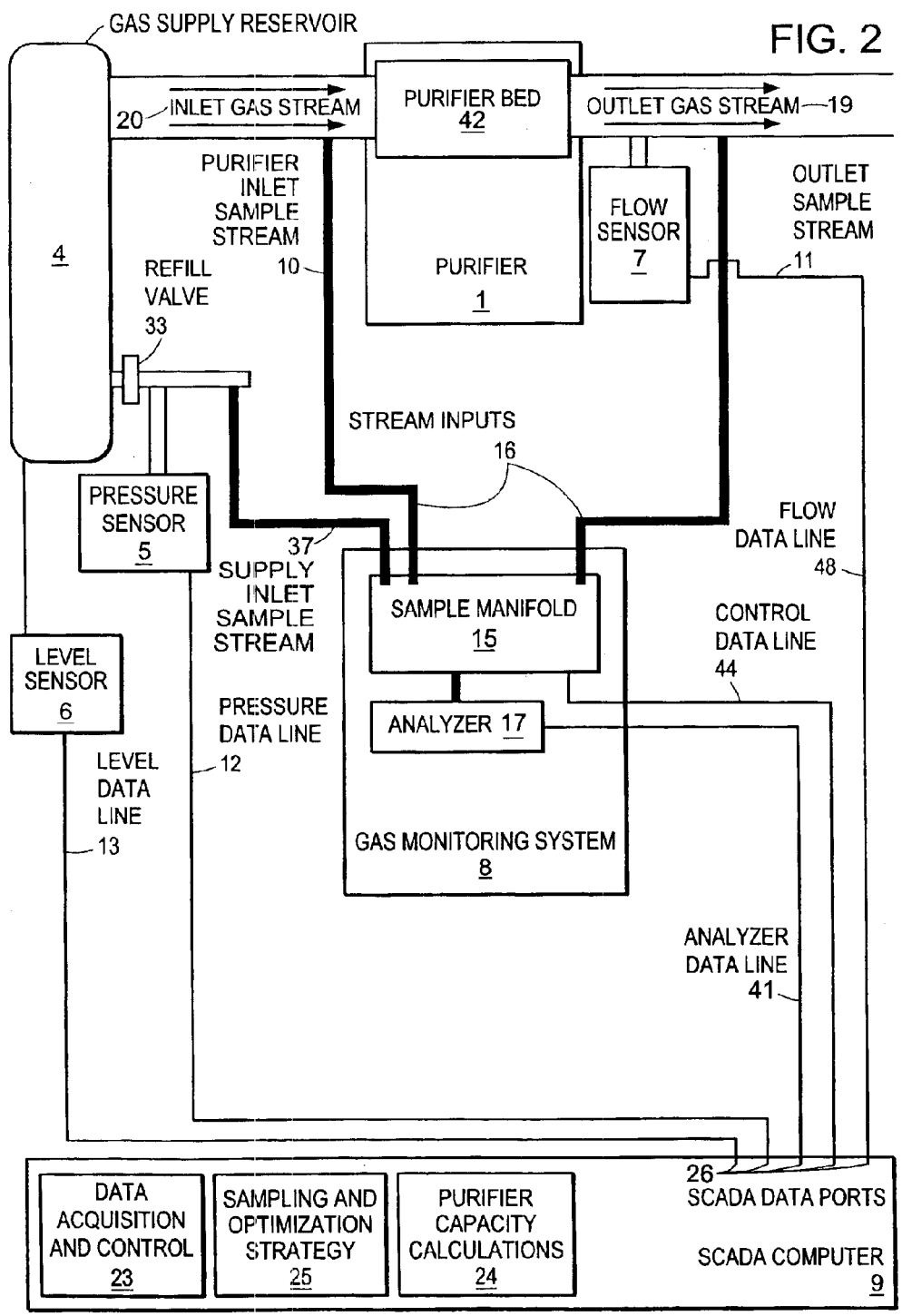
FIG. 2 is a schematic diagram of another implementation of the present invention.

FIG. 2 shows another embodiment of the invention. In this embodiment, the purifier 1 contains a consumable non-regenerable purifier bed 42 that has to be replaced after its purification capacity is consumed. Again, the purifier bed 42 may be any filter or container standing between two streams of gas, 20 and 19. The prediction of purifier bed life is accomplished by dynamically tracking percentage of purifier bed consumption continuously in real time. The purifier bed 42 is consumed as the substance removed from the inlet stream 11 accumulates in the bed, the bed serving as the container for the substance.

In the embodiment of the invention shown on FIG. 2, the sample manifold 15 has two inputs 16 and is controlled directly by the SCADA computer 9 via the control data line 44. The analyzer 17 transmits the analyzer data output directly to the SCADA computer 9 via the analyzer data line 41. Also, the level sensor 6, the pressure sensor 5, and the flow sensor 7 are transmitting their data directly to the SCADA computer 9 via the data lines 13, 12, and 48, respectively. In this embodiment of the invention, the SCADA computer 9 performs all control and data acquisition functions in the system.

Figure 3:
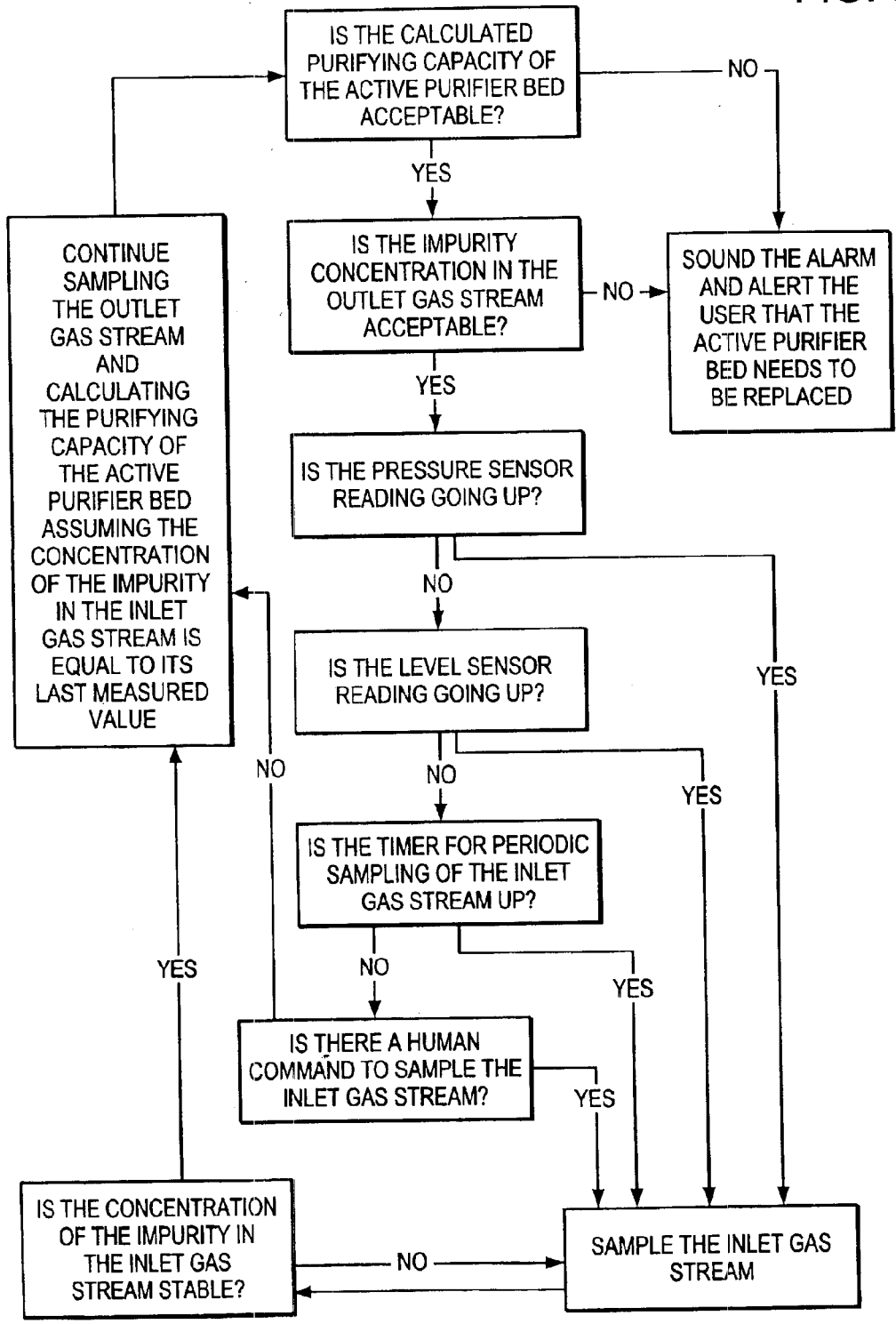
FIG. 3 is a flowchart showing the flow of control and data for the embodiments of FIGS. 1 and 2.

FIG. 3 illustrates the flow of control and data for the embodiments of FIGS. 1 and 2.

In other embodiments of this invention, the change in sample stream can be accomplished in different ways, such as: on demand by a human operator or on a timed interval by the GMS 8. In such systems, the pressure sensor 5 and/or level sensor 6 may be unnecessary. The flow sensor 7 may also be unnecessary as the flow rate in some embodiments of the invention may be known exactly in advance, thus making the elimination of the flow sensor possible.

Other embodiments of this invention may be used on systems other than gas purification systems. The invention can be used for liquid filtering or purifying systems or systems filtering or purifying other conveyable materials. The function of the bed through which the material flows may be not filtering of unwanted impurities but rather filtering of valuable matter or substance from the inlet stream.

While this invention has been particularly shown and described with references to preferred embodiments thereof, it will be understood by those skilled in the art that various changes in form and details may be made therein without departing from the scope of the invention encompassed by the appended claims.

What is claimed is:

1. A device for determining amount of a substance in a container, comprising:
   an analyzer with stream inputs, wherein a first analyzer stream input is a container inlet sample stream input, and a second analyzer input is a container outlet sample stream input, the analyzer producing analyzer data output, and
   a computation unit, the computation unit using the analyzer data output and determining amount of the substance in the container, the container having an inlet and an outlet.

2. The device of claim 1 wherein the container inlet sample stream input and the container outlet sample stream input are gas sample stream inputs and the analyzer is a gas analyzer.

3. The device of claim 1 wherein the container is a filtering device.

4. The device of claim 3 wherein the computation unit determines available filtering capacity of the filtering device.

5. The device of claim 1 wherein the computation unit selects analyzer stream inputs for analysis by the analyzer.

6. The device of claim 5 further comprising a flow data port coupled to the computation unit.

7. The device of claim 5 further comprising a pressure data port coupled to the computation unit.

8. The device of claim 5 further comprising a level data port coupled to the computation unit.

9. The device of claim 5 wherein the container is a filtering device and the computation unit determines available filtering capacity of the filtering device.

10. The device of claim 1 further comprising a supply reservoir, the supply reservoir having an inlet and an outlet, the container's inlet being in connection with the supply reservoir's outlet, a first analyzer stream input being a supply reservoir inlet sample stream input, and a second analyzer stream input being a container outlet sample stream input.

11. A method for determining amount of a substance in a container, comprising the steps of:

receiving data output from an analyzer with multiple analyzer stream inputs by a computation unit, wherein a first analyzer stream input is a container inlet sample stream input, and a second analyzer stream input is a container outlet sample stream input, and determining amount of the substance in the container by the computation unit, the container having an inlet and an outlet.

12. The method of claim 11 wherein the container inlet sample stream input and the container outlet sample stream input are gas sample stream inputs and the analyzer is a gas analyzer.

13. The method of claim 11 wherein the container is a filtering device.

14. The method of claim 13 further comprising the step of determining the available filtering capacity of the filtering device by the computation unit.

15. The method of claim 11 further comprising the step of selecting analyzer stream inputs by the computation unit.

16. The method of claim 15 further comprising the step of receiving flow data by the computation unit.

17. The method of claim 15 further comprising the step of receiving pressure data by the computation unit.

18. The method of claim 15 further comprising the step of receiving level data by the computation unit.

19. The method of claim 15 further comprising the step of determining the available filtering capacity of the container by the computation unit, wherein the container is a filtering device.

20. The method of claim 11 wherein:

the container is in connection with a supply reservoir having an inlet and an outlet, the coupling using the container's inlet and the supply reservoir's outlet, a first analyzer stream input is a supply reservoir inlet sample stream input, and a second analyzer stream input is a container outlet sample stream input.

* * * * *